(12) United States Patent
Sugihara

(10) Patent No.: US 10,583,642 B2
(45) Date of Patent: *Mar. 10, 2020

(54) HONEYCOMB STRUCTURAL BODY AND METHOD OF MANUFACTURING HONEYCOMB STRUCTURAL BODY

(71) Applicant: SUBARU CORPORATION, Tokyo (JP)

(72) Inventor: Yasunori Sugihara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 113 days.

This patent is subject to a terminal disclaimer.

(21) Appl. No.: 15/715,992

(22) Filed: Sep. 26, 2017

(65) Prior Publication Data

US 2018/0015685 A1    Jan. 18, 2018

Related U.S. Application Data

(62) Division of application No. 14/644,915, filed on Mar. 11, 2015, now Pat. No. 9,802,382.

(30) Foreign Application Priority Data

Mar. 25, 2014   (JP) .................................. 2014-061870

(51) Int. Cl.
*B32B 37/14*     (2006.01)
*B32B 3/12*      (2006.01)
(Continued)

(52) U.S. Cl.
CPC ........ *B32B 37/146* (2013.01); *B29D 99/0089* (2013.01); *B32B 3/12* (2013.01);
(Continued)

(58) Field of Classification Search
CPC ... B29D 99/0089; B32B 37/146; B32B 37/29; B32B 2037/264; B32B 2037/266;
(Continued)

(56) References Cited

U.S. PATENT DOCUMENTS 4,016,022 A * 4/1977 Browning ............... B29C 70/12
                                                        156/285
5,455,096 A    10/1995 Toni et al.
(Continued)

FOREIGN PATENT DOCUMENTS

JP    S60-097840 A    5/1985
JP    H01-195024 A    8/1989
(Continued)

OTHER PUBLICATIONS

Second Japanese Office Action dated Feb. 16, 2016 in Patent Application No. 2014-061870. (Japanese with English translation—7 pages total).

*Primary Examiner* — John L Goff, II
(74) *Attorney, Agent, or Firm* — Smith, Gambrell & Russell, LLP

(57) ABSTRACT

A honeycomb structural body includes multiple cores, at least face sheet, and at least one reinforcement sheet. The multiple cores each have a honeycomb structure, and are bonded to each other with foamed adhesive in a direction in which the number of multiple pores formed by the honeycomb structure increases. The at least one face sheet is adhered to the multiple cores so as to cover the multiple pores. The reinforcement sheet is placed between the multiple cores and the at least one face sheet, at a position where the reinforcement sheet covers the foamed adhesive.

11 Claims, 10 Drawing Sheets

(51) Int. Cl.
*B32B 37/12* (2006.01)
*B32B 37/00* (2006.01)
*B32B 37/10* (2006.01)
*B32B 37/26* (2006.01)
*B32B 3/14* (2006.01)
*B32B 5/18* (2006.01)
*B32B 7/12* (2006.01)
*B29D 99/00* (2010.01)
*B32B 37/18* (2006.01)

(52) U.S. Cl.
CPC ............... *B32B 3/14* (2013.01); *B32B 5/18* (2013.01); *B32B 7/12* (2013.01); *B32B 37/0007* (2013.01); *B32B 37/10* (2013.01); *B32B 37/12* (2013.01); *B32B 37/26* (2013.01); *B32B 37/1018* (2013.01); *B32B 37/18* (2013.01); *B32B 2305/024* (2013.01); *B32B 2305/076* (2013.01); *B32B 2605/18* (2013.01); *Y10T 156/10* (2015.01); *Y10T 428/24149* (2015.01)

(58) Field of Classification Search
CPC . B32B 2037/268; B32B 37/26; B29C 66/725; B29C 66/72525; B29C 66/7254; B29C 66/114; B29C 66/1142; B29C 66/435
USPC ......... 156/77–79, 304.1, 304.2, 304.3, 304.5
See application file for complete search history.

(56) References Cited

U.S. PATENT DOCUMENTS 5,776,579 A   7/1998  Jessup et al.
5,876,546 A * 3/1999  Cloud ..................... B29C 35/02
                                                  156/212
9,802,382 B2* 10/2017  Sugihara .................. B32B 3/12

FOREIGN PATENT DOCUMENTS

| JP | H10-006417 A | 1/1998 |
| JP | 2000/502968 A | 3/2000 |
| JP | 2007/015385 A | 1/2007 |
| JP | 2012-516254 A | 7/2012 |
| WO | 97/25198 A1 | 7/1997 |
| WO | 2010/088063 A1 | 8/2010 |

* cited by examiner

HONEYCOMB STRUCTURAL BODY AND METHOD OF MANUFACTURING HONEYCOMB STRUCTURAL BODY

CROSS-REFERENCE TO RELATED APPLICATION

The present application claims priority from Japanese Patent Application No. 2014-061870 filed on Mar. 25, 2014, the entire contents of which are hereby incorporated by reference.

BACKGROUND

1. Technical Field

An example of the present disclosure relates to a honeycomb structural body and a method of manufacturing the honeycomb structural body.

2. Related Art

Conventionally, honeycomb structural bodies are used as structural members of airplanes in order to reduce weight and improve mechanical strength of the airplanes. For example, Japanese Unexamined Patent Application Publication (JP-A) Nos. S60-097840, H10-006417, and H01-195024 disclose typical honeycomb structural bodies that are formed by sandwiching or laminating a core having a honeycomb structure with skins (face sheets) made of composite material, such as Fiber Reinforced Plastics (FRP).

If the honeycomb structural body is large in size or has a curved surface, multiple cores having a honeycomb structure are preliminarily joined or bonded together. The preliminary bonding of the cores is often carried out with foamed adhesives that inflate by heat. Therefore, when manufacturing a large-sized honeycomb structural body, the cores are preliminarily bonded by heat curing of the foamed adhesive, and skin prepreg(s) that is a material of the skin is then placed on the bonded cores. The laminated skin prepreg(s) and the bonded cores are heated under pressure.

SUMMARY OF THE INVENTION

A purpose of the present disclosure is to provide a honeycomb structural body that can be manufactured by simpler processes, and a method of manufacturing the honeycomb structural body.

An aspect of the present disclosure provides a honeycomb structural body including multiple cores that each have a honeycomb structure, and are bonded to each other with foamed adhesive in a direction in which the number of multiple pores formed by the honeycomb structure increases, at least one face sheet adhered to the multiple cores so as to cover the multiple pores, and at least one reinforcement sheet placed between multiple cores and the at least one face sheet, at a position where the at least one reinforcement sheet covers the foamed adhesive.

Another aspect of the present disclosure provides a method of manufacturing a honeycomb structural body including placing multiple cores that each have having a honeycomb structure on both sides of foamed adhesive in a direction in which the number of multiple pores formed by the honeycomb structure increases, placing at least one skin prepreg on the multiple cores so as to cover the multiple pores, protecting an outer surface side of the at least one skin prepreg by a bagging film, at least one reinforcement sheets at least either one of between the skin prepreg and the bagging film and between the at least one skin prepreg and the multiple cores, at the position where the at least one reinforcement sheet covers the foamed adhesive, and manufacturing the honeycomb structural body in which the multiple cores are bonded to each other with the foamed adhesive and the at least one face sheet that is cured is bonded to the multiple cores, by heating and pressurizing the multiple cores, the at least one skin prepreg, the bagging film, and the at least one reinforcement sheet in a set state.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

A honeycomb structural body and a method of manufacturing the honeycomb structural body according to several examples of the present disclosure are described with reference to the accompanying drawings.

First Example

Figure 1:
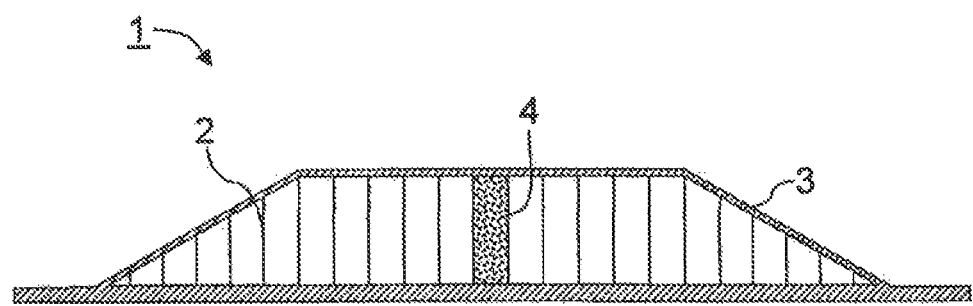
FIG. 1 is a cross-sectional view illustrating an example structure of a honeycomb structural body according to a first example of the present disclosure.
Figure 2:
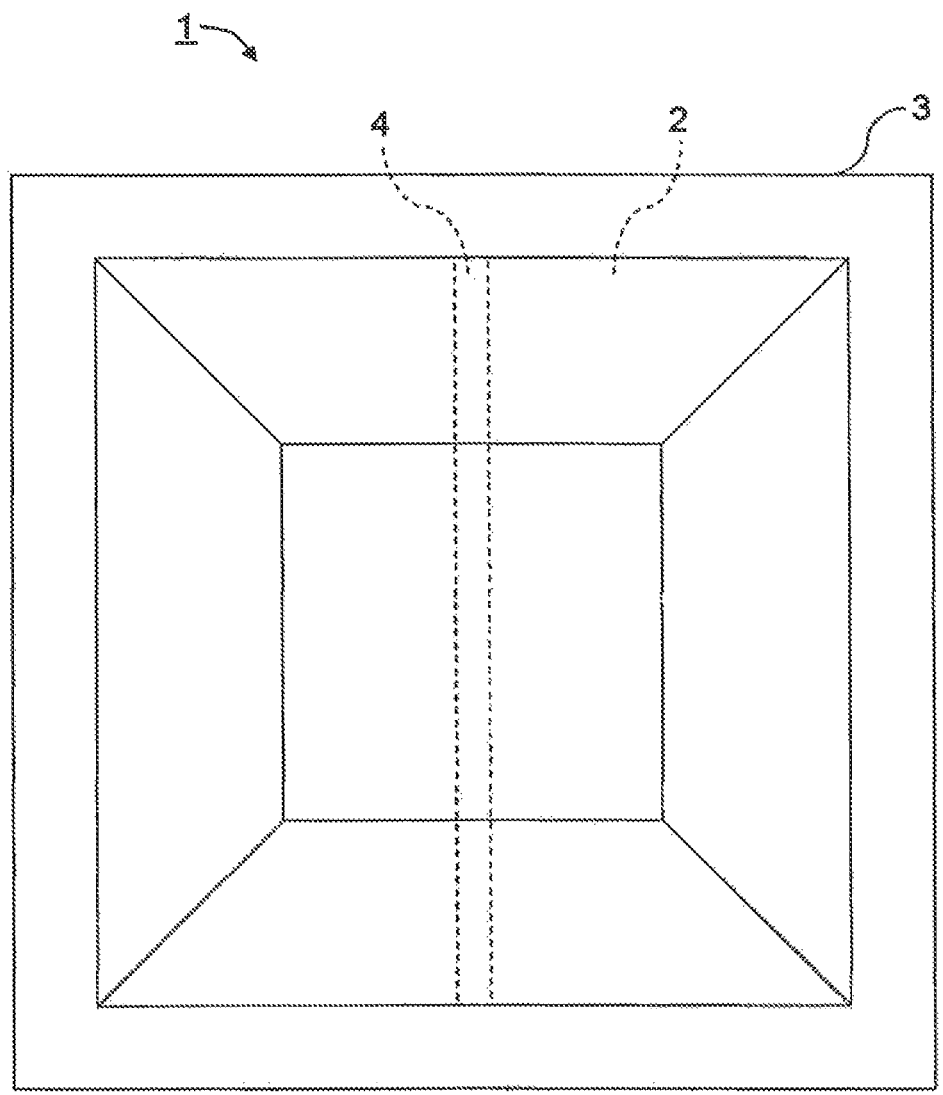
FIG. 2 is a top view of the honeycomb structural body illustrated in FIG. 1.

FIG. 1 is a cross-sectional view illustrating an example structure of a honeycomb structural body according to a first example of the present disclosure, and FIG. 2 is a top view of the honeycomb structural body illustrated in FIG. 1.

The honeycomb structural body 1 has a structure in which skins 3 are adhered on multiple cores 2. The cores 2 each has a honeycomb structure, and the cores 2 are bonded to each other with the foamed adhesive 4 in a direction in which the number of pores formed by the honeycomb structures increases. The honeycomb structure in which the core 2 has in a matrix is not limited to an angled cylindrical shape having a hexagonal shape in lateral cross section, but may be any other cylindrical shapes having any lateral cross-sectional shapes.

Further, the height of the honeycomb structure of each core 2 may be constant, or may vary along a mold. In the example illustrated in FIGS. 1 and 2, four corners of two bonded cores 2 incline.

The sheet-shaped skins 3 are adhered on the cores 2 so as to cover the multiple pores formed by the honeycomb structure. In the example illustrated in FIGS. 1 and 2, the cores 2 that is joined to each other with the foamed adhesive 4 is sandwiched by two sheets of skin 3. That is, the honeycomb structural body 1 has a sandwich structure in which the cores 2 is sandwiched by the two sheets of skin 3. In addition, since the four corners of the two cores 2 incline, the upper skin 3 also inclines along the cores 2.

Each skin 3 that constitutes the honeycomb structural body 1 is made of composite material. On the other hand, the core 2 can be made of composite material or metal.

The honeycomb structural body 1 having such a structure can be used as a structural component of, for example, an airplane. That is, the skins 3 and the cores 2 can constitute components of the airplane.

Next, a method of manufacturing the honeycomb structural body 1 is described.

Figure 3:
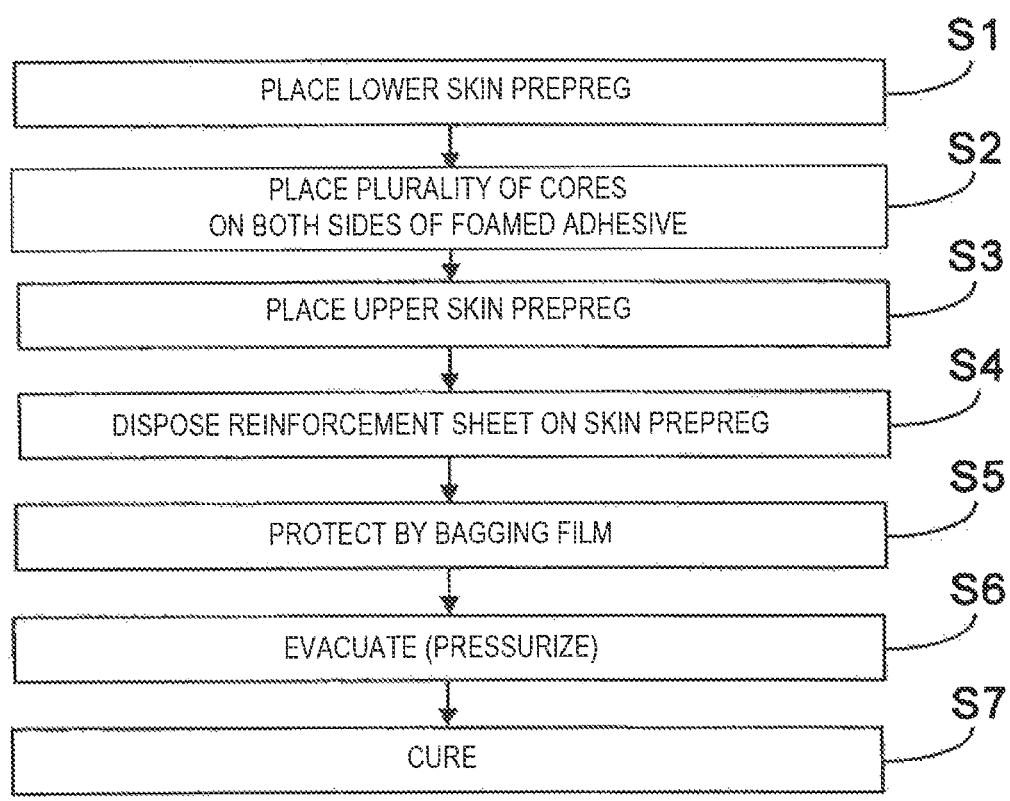
FIG. 3 is a flowchart illustrating a method of manufacturing the honeycomb structural body illustrated in FIG. 1.
Figure 4:
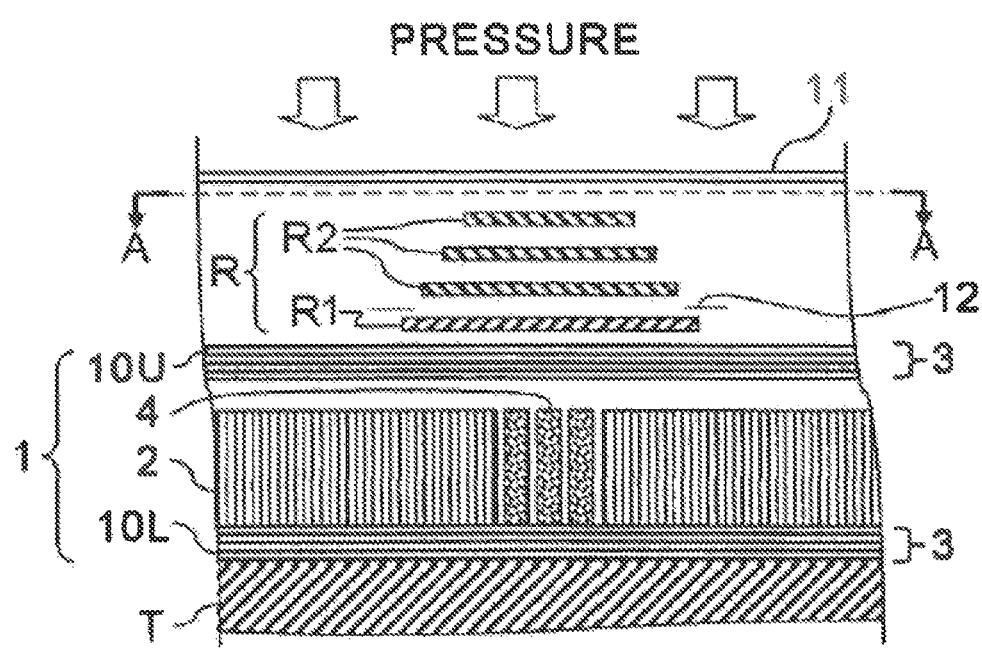
FIG. 4 is a view illustrating the method of manufacturing the honeycomb structural body illustrated in FIG. 1.
Figure 5:
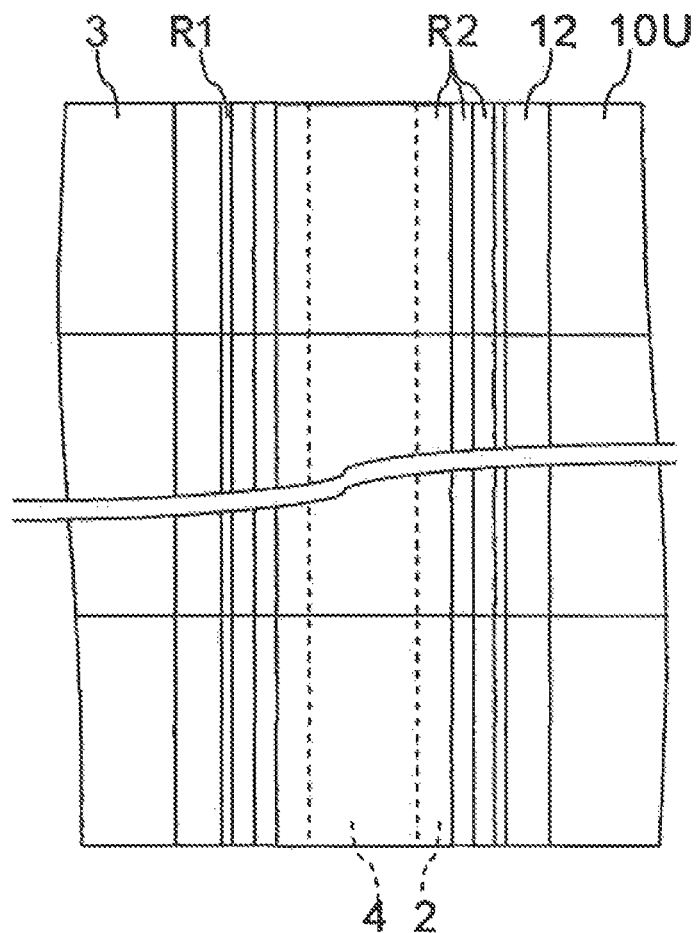
FIG. 5 is a top view of the honeycomb structural body seen at a position A-A of FIG. 4.

FIG. 3 is a flowchart illustrating the method of manufacturing the honeycomb structural body 1 illustrated in FIG. 1. FIG. 4 is a view illustrating the method of manufacturing the honeycomb structural body 1 illustrated in FIG. 1, and FIG. 5 is a top view of the honeycomb structural body 1 seen at a position A-A of FIG. 4.

In Step S1, a skin prepreg 10L that is the material of the lower skin 3 is first placed on a molding jig T. Next, at Step S2, the cores 2 each having the honeycomb structure is placed on the lower skin prepreg 10L. Note that the cores 2 is disposed on both sides of the foamed adhesive 4 in the direction in which the number of multiple pores formed by the honeycomb structure increases. Next, at Step S3, a skin prepreg 10U that is the material of the upper skin 3 is placed on the cores 2 so as to cover the multiple pores formed by the honeycomb structure.

Next, at Step S4, a reinforcement sheet R is disposed on the outer surface side of the upper skin prepreg 10U as part of the molding jig T, at such a position that the reinforcement sheet R covers the foamed adhesive 4. Next, at Step S5, the outer surface side of the upper skin prepreg 10U where the reinforcement sheet R is disposed is protected by a film-shaped bagging film 11. Next, at Step S6, an internal space protected by the bagging film 11 is evacuated. As a result, a semi-finished product of the honeycomb structural body 1 comprised of the lower skin prepreg 10L, the cores 2, the foamed adhesive 4, and the upper skin prepreg 10U is pressurized together with the reinforcement sheet R by atmospheric pressure.

Next, at Step S7, the semi-finished product of the honeycomb structural body 1 and the reinforcement sheet R that are pressurized by evacuating the internal space of the bagging film 11 are transferred into an autoclave apparatus. Then, the foamed adhesive 4 and the upper and lower skin prepregs 10U and 10L are thermally cured by autoclave processing. As a result, the honeycomb structural body 1 in which the upper skin 3 and the lower skin 3 are bonded to the cores 2 bonded with the foamed adhesive 4 can be obtained so that the upper and lower skins 3 are deformed into predetermined shapes.

As described above, because the cores 2, the skin prepregs 10U and 10L, the bagging film 11, and the reinforcement sheet R are heated and pressurized in a set state, the honeycomb structural body 1 in which the cores 2 is bonded to each other with the foamed adhesive 4, and the cured skins 3 are bonded to the cores 2, can be manufactured.

That is, since the reinforcement sheet R is disposed at the position between the bagging film 11 and the skin prepreg 10U where the reinforcement sheet R covers the foamed adhesive 4, the adhesion of the cores 2 with the foamed adhesive 4 and the curing of the skin prepregs 10U and 10L can be performed by the single heating process. This is made possible by the upper skin prepreg 10U not being dented because part of the upper skin prepreg 10U placed over the foamed adhesive 4 is mechanically reinforced by the reinforcement sheet R when the upper skin prepreg 10U is heated and pressurized.

In other words, if the adhesion of the cores 2 with the foamed adhesive 4 and the curing of the skin prepregs 10U and 10L are performed in a single heating process without providing the reinforcement sheet R, the part of the upper skin prepreg 10U placed over the foamed adhesive 4 will be distorted. As a result, the honeycomb structural body 1 is deteriorated in its appearance and mechanical strength, resulting in difficulties to satisfy quality requirements of the product. For this reason, it has been considered to be unreal to perform the adhesion of the cores 2 with the foamed adhesive 4 and the curing of the skin prepregs 10U and 10L in a single heating process.

On the other hand, if the honeycomb structural body 1 is manufactured by the manufacturing method described above, the honeycomb structural body 1 having the satisfactory appearance and mechanical strength can be manufactured at least in a single heating process.

It is preferred to provide multiple reinforcement sheets R between the upper skin prepreg 10U and the bagging film 11 as illustrated in FIGS. 4 and 5 in order to prevent the deterioration of quality, such as the dent and damages of the upper skin prepreg 10U. If the reinforcement sheets R is provided between the upper skin prepreg 10U and the bagging film 11, the reinforcement sheets R having mutually different widths as illustrated can be placed so that the reinforcement sheets R forms steps in thickness directions thereof.

In particular, if the reinforcement sheets R having flexibility is laminated in the stepped manner, flexibility can be maintained while securing the thickness that can bear the forming pressure. Therefore, even if the ideal post-cured shape of the skin 3 involves a complicated curved surface, the reinforcement sheets R can be bent along the skin 3.

In addition, it is effective for each reinforcement sheet R to form chamfers to conform to the post-cured shape of the skin 3.

Damages to the skin 3 due to the placement of the reinforcement sheets R can be avoided by adjusting the widths of the reinforcement sheets R and forming the chamfers and, thus, the ideal post-fabricated shape of the skin 3 can be obtained. That is, the mechanical strength of the reinforcement sheets R that is enough to prevent the dent of the skin prepreg 10U can be secured, without forming the steps at the edges of the reinforcement sheets R that may cause the damages to the skin 3 and/or insufficient deformation of the skin 3.

Cured prepreg is suitable for the material of the reinforcement sheet R. In particular, it was confirmed to be effective for preventing the dent of the skin prepreg 10U from the results of examinations, if the reinforcement sheet R1 comprised of GFRP (Glass Fiber Reinforced Plastics) is disposed on the skin prepreg 10U side, and the reinforcement sheet R2 comprised of CFRP (Carbon Fiber Reinforced Plastics) on the bagging film 11 side.

This is considered to be made possible because the conformity of the reinforcement sheet R1 to the shape of the skin prepreg 10U is improved by disposing the reinforcement sheet R1 comprised of the flexible GFRP on the skin prepreg 10U side. Note that the reinforcement sheet R1 comprised of GFRP may be adhered to the skin prepreg 10U by using Teflon® tape 12 as needed.

That is, the honeycomb structural body 1 described above is manufactured in a single thermal curing process by providing the reinforcement sheet R between the upper skin prepreg 10U and the bagging film 11, although the curing of prepreg and the adhesion of the cores 2 are required. Further, the method of manufacturing the honeycomb structural body 1 enables the honeycomb structural body 1 to be manufactured in a single thermal curing process by providing the reinforcement sheet R between the upper skin prepreg 10U and the bagging film 11, although the curing of prepreg and the adhesion of the cores 2 are required.

Effects of the Invention

As described above, according to the method of manufacturing the honeycomb structural body 1, the honeycomb structural body 1 can be manufactured by simpler processes. That is, the preliminary bonding of the honeycomb cores that has been conventionally necessary becomes unnecessary, and the bonding of the cores 2 and the curing of the skin prepregs 10U and 10L can be simultaneously achieved in a single heating process.

If the preliminary bonding of the honeycomb cores is performed using adhesives that harden at room temperature, sufficient adhesive strength will not be obtained. On the other hand, if the bonding of the honeycomb cores and the curing of skin prepregs are performed simultaneously with the foamed adhesive, there has been a problem that a local dent is produced from the gap as the starting point in the bonding part of the honeycomb cores due to the pressurizing by evacuation or formation of the skin prepregs. Therefore, in order to avoid the poor appearance and the lack of strength, the heating and pressurizing have been conventionally required for the preliminary bonding of the honeycomb cores using the foamed adhesive prior to the heating for curing the skin prepregs.

On the other hand, according to the method of manufacturing the honeycomb structural body 1, the dent of the skin prepreg 10U can be prevented by providing the reinforcement sheet R between the skin prepreg 10U and the bagging film 11. As a result, the preliminary bonding of the cores 2 becomes unnecessary, and the honeycomb structural body 1 can be manufactured in a single heating process. Therefore, the manufacturing cost of the honeycomb structural body 1 can be reduced.

In addition, if the preliminary bonding of the honeycomb cores is performed, the trace of the preliminary bonding of the honeycomb cores remains, but the trace of the preliminary bonding does not remain in the honeycomb structural body 1. Therefore, the honeycomb structural body 1 of higher quality in appearance than the conventional technique can be manufactured.

Second Example

Figure 6:
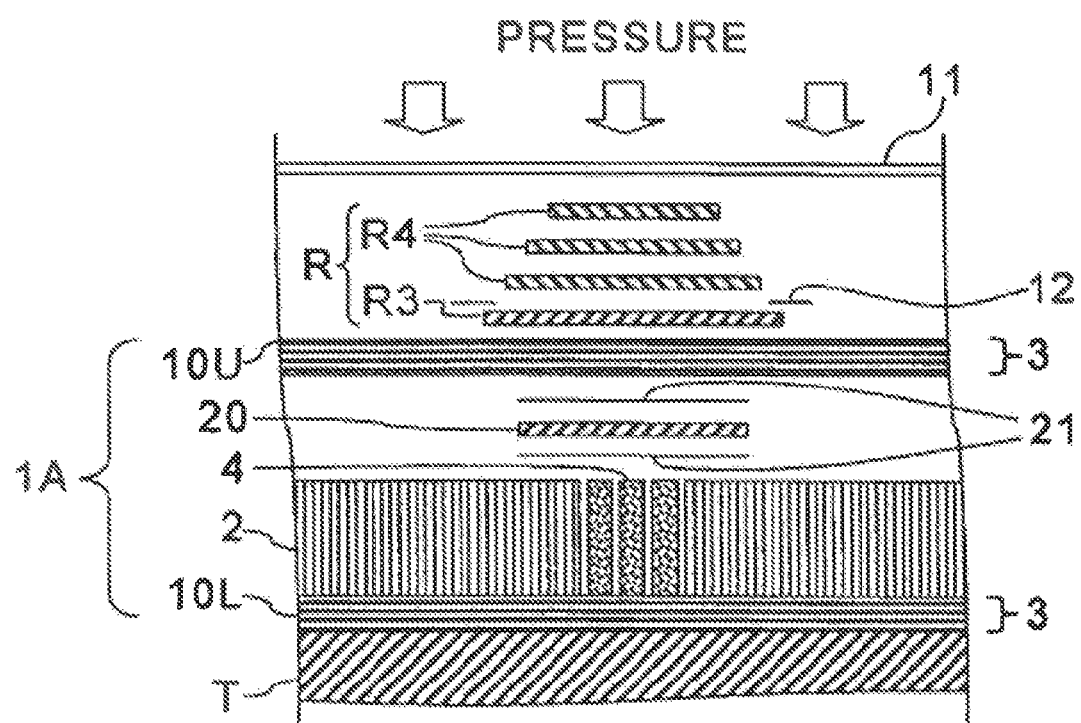
FIG. 6 is a cross-sectional view illustrating an example structure of a honeycomb structural body and a method of manufacturing the honeycomb structural body, according to a second example of the present disclosure.

FIG. 6 is a cross-sectional view illustrating an example structure of a honeycomb structural body and a method of manufacturing the honeycomb structural body according to a second example of the present disclosure.

A honeycomb structural body 1A of the second example illustrated in FIG. 6 is different from the honeycomb structural body 1 of the first example in that the reinforcement sheet 20 is disposed between the cores 2 and the skin 3, at the position where the reinforcement sheet 20 covers the foamed adhesive 4. Since other configurations and operations of the honeycomb structural body 1A of the second example do not substantially differ from the honeycomb structural body 1 of the first example, the same configurations are denoted by the same reference numerals and description thereof is omitted.

In the honeycomb structural body 1A, the reinforcement sheet 20 is disposed between the cores 2 and the skin 3, as a constituent element. The reinforcement sheet 20 is adhered to at least either one of the cores 2 or the skin 3 with film adhesive 21, as needed.

The reinforcement sheet 20 provided between the cores 2 and the skin 3 is appropriately made of composite material. Further, it is desirable to form chamfers that conform to the shape of the skin 3, in the reinforcement sheet 20 provided between the cores 2 and the skin 3. Next, the method of manufacturing the honeycomb structural body 1A is described.

Figure 7:
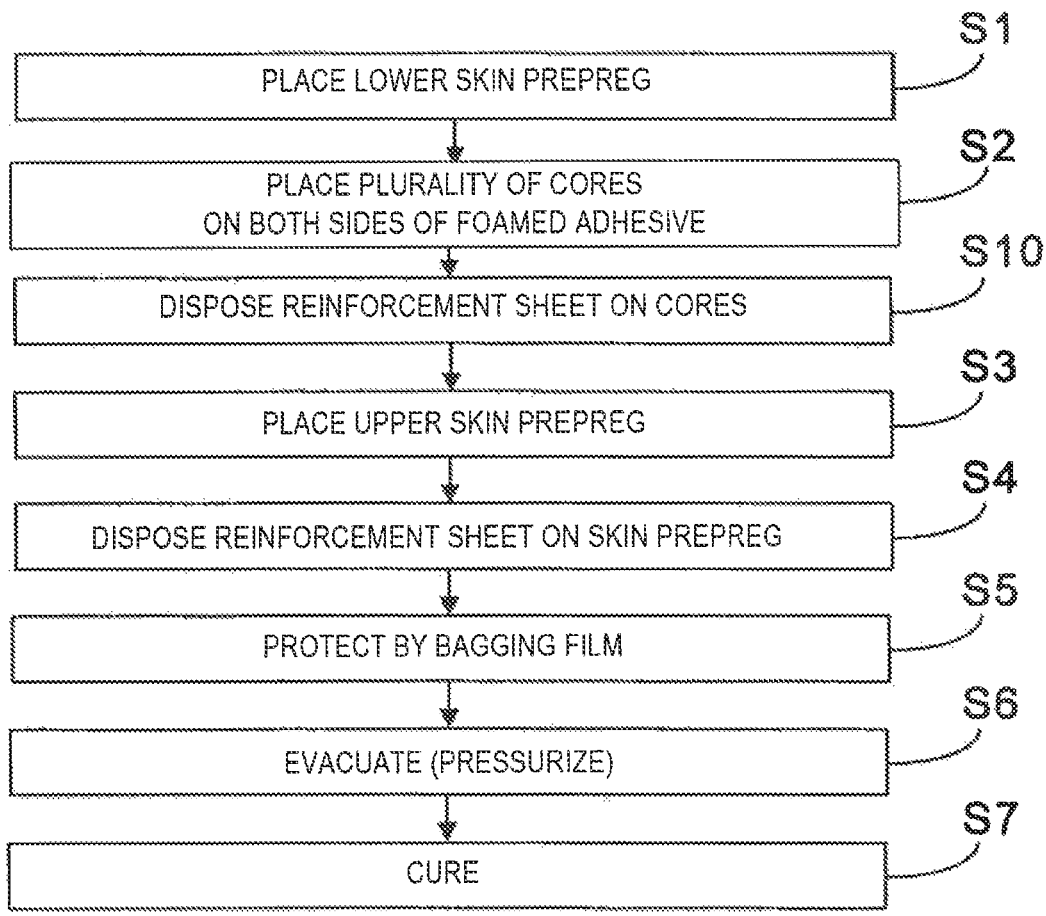
FIG. 7 is a flowchart illustrating the method of manufacturing the honeycomb structural body illustrated in FIG. 6.

FIG. 7 is a flowchart illustrating the method of manufacturing the honeycomb structural body 1A illustrated in FIG. 6. Note that similar steps to those of the flowchart illustrated in FIG. 3 are denoted with the same reference numerals, and description thereof is omitted.

When manufacturing the honeycomb structural body 1A having the reinforcement sheet 20 between the cores 2 and the skin 3, the reinforcement sheet 20 is placed at Step S10 before placing the upper skin prepreg 10U. The reinforcement sheet 20 is placed between the upper skin prepreg 10U and the cores 2, at the position where the reinforcement sheet 20 covers the foamed adhesive 4, as illustrated in FIG. 6.

The reinforcement sheet 20 can be adhered to at least either one of the cores 2 or the upper skin prepreg 10U with the film adhesive 21.

The material of reinforcement sheet 20 is appropriately made of a sheet prepreg cured in advance. Thus, the honeycomb structural body 1A having the reinforcement sheet 20 comprised of composite material between the cores 2 and the skin 3 can be manufactured by heating and pressurizing a semi-finished product of the honeycomb structural body 1A containing the lower skin prepreg 10L, the cores 2, the foamed adhesive 4, the reinforcement sheet 20 comprised of the prepreg cured in advance, and the upper skin prepreg 10U.

Such a honeycomb structural body 1A of the second example is manufactured by thermally curing in a state where the reinforcement sheet 20 is placed between the upper skin prepreg 10U and the cores 2, in addition to the reinforcement sheet R placed between the upper skin prepreg 10U and the bagging film 11. Thus, like a case where the gaps between the cores 2 are large, or a case where the pore diameter of the honeycomb structure is large, the generation of the dent can be prevented more certainly even if it is in a condition in which the dents tend to be easily generated between the cores 2.

In particular, as illustrated in FIG. 6, it was confirmed by examinations to be effective to place the first reinforcement sheet 20 made of the cured prepreg between the skin prepreg 10U and the cores 2, the second reinforcement sheet R3 made of GFRP on the skin prepreg 10U side between the skin prepreg 10U and the bagging film 11, and the third reinforcement sheet R4 made of CFRP to the bagging film 11 between the skin prepreg 10U and the bagging film 11, respectively. In addition, it was confirmed to be effective to use FRP having flexibility as the first reinforcement sheet 20.

Third Example

Figure 8:
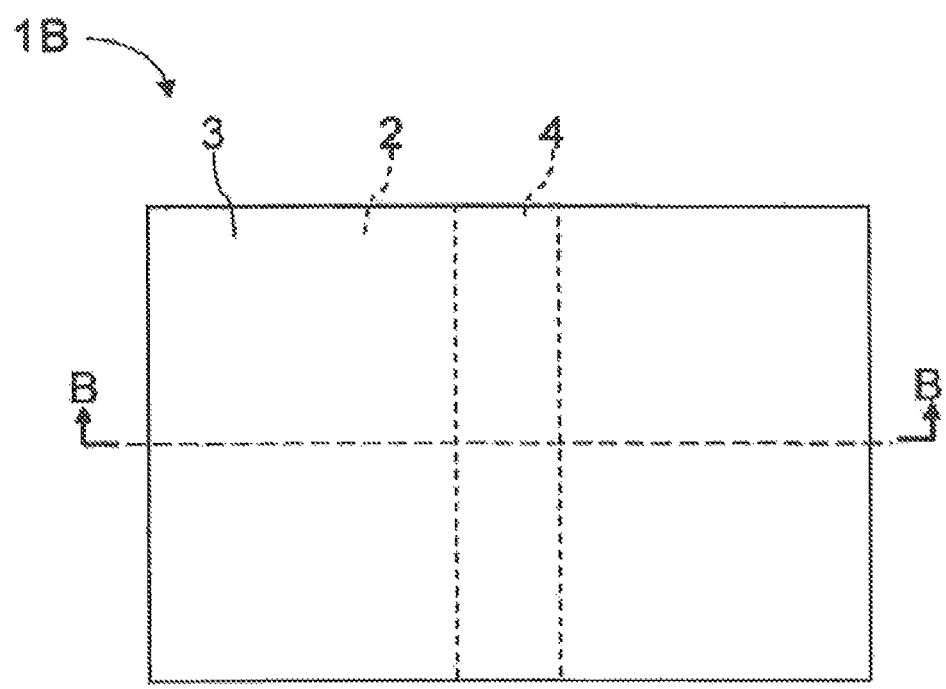
FIG. 8 is a top view illustrating an example structure of a honeycomb structural body according to a third example of the present disclosure.
Figure 9:
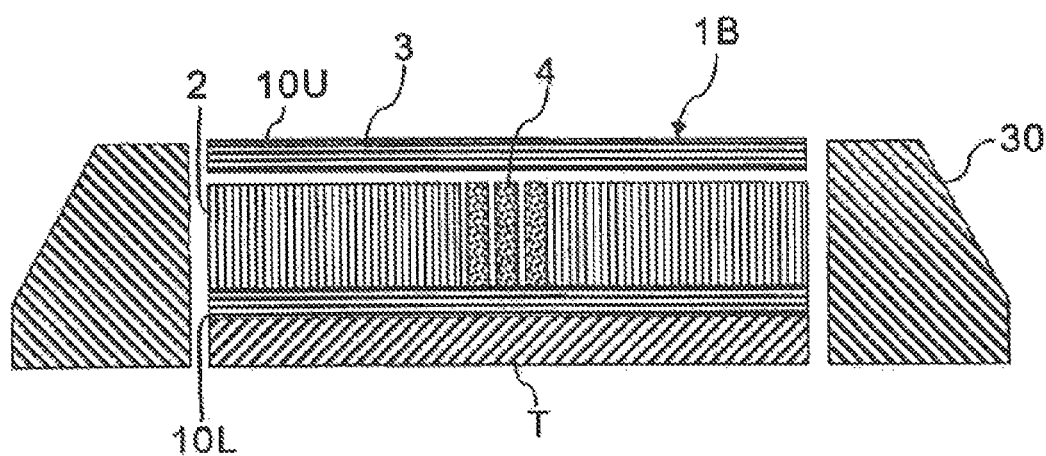
FIG. 9 is a cross-sectional view illustrating a method of manufacturing the honeycomb structural body illustrated in FIG. 8, taken along a line B-B.
Figure 10:
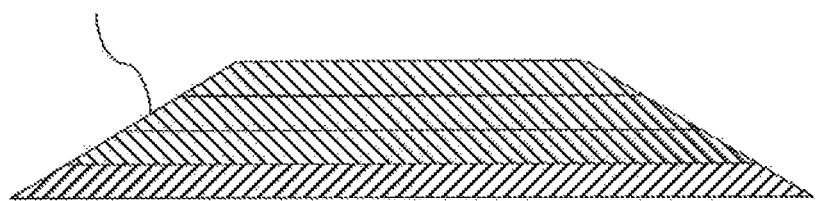
FIG. 10 is an isolated view of a stack of reinforcement sheets, with each reinforcement sheet in the stack having chamfers.

FIG. 8 is a top view illustrating an example structure of a honeycomb structural body according to a third example of the present disclosure, and FIG. 9 is a cross-sectional view illustrating a method of manufacturing the honeycomb structural body illustrated in FIG. 8, taken along a line B-B.

The honeycomb structural body 1B of the third example illustrated in FIG. 8 is different from the honeycomb structural bodies 1 and 1A of the first and second examples in that the cores 2 is externally exposed. Since other configurations and operations of the honeycomb structural body 1B of the third example do not substantially differ from the honeycomb structural bodies 1 and 1A of the first and second examples, the same configurations are denoted by the same reference numerals and description thereof is omitted.

As illustrated in FIG. 8, the honeycomb structural body 1B, in which the entire surface of the cores 2 having honeycomb structures is not closed or covered by the skin 3, may also be manufactured. In the example illustrated in FIG. 8, the cores 2 are externally exposed at four side faces of the honeycomb structural body 1B. In such a case, one or more stoppers 30 for preventing a slip of the cores 2 may be provided at necessary locations as jigs, as illustrated in FIG. 9.

The reinforcement sheet of this example is similarly placed to the first and second examples. Note that, if the reinforcement sheet 20 is provided between the skin prepreg 10U and the cores 2, the reinforcement sheet R to be placed between the bagging film 11 and the skin prepreg 10U may be omitted. That is, the honeycomb structural body 1B can be manufactured by placing the reinforcement sheets R and 20 at least either one of between the skin prepreg 10U and the bagging film 11 or between the skin prepreg 10U and the cores 2, at the position where the reinforcement sheets R and 20 cover the foamed adhesive 4.

Other Examples

As described above, although particular examples of the present disclosure are described, these examples are merely examples and do not limit the scope of the present disclosure. The novel method and device described herein may be embodied in other various forms. Further, the forms of the method and device described herein may be variously omitted, substituted and changed or modified without departing from the scope of the present disclosure. The appended claims and their equivalents encompass such various forms and modifications as being fallen under the scope and the spirit of the present disclosure.

The invention claimed is:

1. A method of manufacturing a honeycomb structural body, comprising;
    placing multiple cores that each have a honeycomb structure on both sides of foamed adhesive in a direction in which a number of multiple pores formed by the honeycomb structure is increased;
    placing at least one skin prepreg on the multiple cores so as to cover the multiple pores;
    protecting an outer surface side of the at least one skin prepreg by a bagging film;
    placing at least one reinforcement sheet between the at least one skin prepreg and the multiple cores at a position where the at least one reinforcement sheet covers the foamed adhesive; and
    manufacturing the honeycomb structural body in which the multiple cores are bonded to each other with the foamed adhesive, and the at least one skin prepreg is cured and bonded to the multiple cores, by heating and pressurizing the multiple cores, the at least one skin prepreg, the bagging film, and the at least one reinforcement sheet in a set state, wherein
    a pre-cured prepreg is used as the at least one reinforcement sheet.

2. The method of manufacturing the honeycomb structural body of claim 1, further comprising:
    placing a stack of reinforcement sheets between the at least one skin prepreg and the bagging film, wherein the stack of reinforcement sheets comprises sheets that have mutually different widths and which are placed between the at least one skin prepreg and the bagging film in order of width.

3. The method of manufacturing the honeycomb structural body of claim 2, wherein the stack of reinforcement sheets placed between the at least one skin prepreg and the bagging film comprises a reinforcement sheet made of glass fiber reinforced plastics that is placed on the at least one skin prepreg side between the at least one skin prepreg and the bagging film, and a reinforcement sheet made of carbon fiber reinforced plastics that is placed on the bagging film side between the at least one skin prepreg and the bagging film.

4. The method of manufacturing the honeycomb structural body of claim 2, wherein the at least one reinforcement sheet placed between the at least one skin prepreg and the multiple cores is bonded with a film adhesive to the multiple cores, the at least one skin prepreg, or both the multiple cores and the at least one skin prepreg.

5. The method of manufacturing the honeycomb structural body of claim 1, further comprising:
    placing a stack of reinforcement sheets between the at least one skin prepreg and the bagging film, wherein the stack of reinforcement sheets comprises a reinforcement sheet made of glass fiber reinforced plastics that is placed on the at least one skin prepreg side between the at least one skin prepreg and the bagging film, and a reinforcement sheet made of carbon fiber reinforced plastics that is placed on the bagging film side between the at least one skin prepreg and the bagging film.

6. The method of manufacturing the honeycomb structural body of claim 5, wherein the at least one reinforcement sheet placed between the at least one skin prepreg and the multiple cores is bonded with a film adhesive to the multiple cores, the at least one skin prepreg, or both the multiple cores and the at least one skin prepreg.

7. The method of manufacturing the honeycomb structural body of claim 1, wherein the at least one reinforcement sheet is bonded with a film adhesive to the multiple cores, the at least one skin prepreg, or both the multiple cores and the at least one skin prepreg.

8. A method of manufacturing a honeycomb structural body, comprising:
    placing multiple cores that each have a honeycomb structure on both sides of foamed adhesive in a direction in which a number of multiple pores formed by the honeycomb structure is increased;
    placing at least one skin prepreg on the multiple cores so as to cover the multiple pores;
    protecting an outer surface side of the at least one skin prepreg by a bagging film;
    placing at least one reinforcement sheet at, at least, either one of between the at least one skin prepreg and the bagging film, and between the at least one skin prepreg and the multiple cores, at a position where the at least one reinforcement sheet covers the foamed adhesive; and
    manufacturing the honeycomb structural body in which the multiple cores are bonded to each other with the foamed adhesive, and the at least one skin prepreg is cured and bonded to the multiple cores, by heating and pressurizing the multiple cores, the at least one skin prepreg, the bagging film, and the at least one reinforcement sheet in a set state, wherein the at least one reinforcement sheet comprises multiple reinforcement sheets including a first reinforcement sheet made of cured prepreg that is placed between the at least one skin prepreg and the multiple cores, a second reinforcement sheet made of glass fiber reinforced plastics that is placed on the at least one skin prepreg side between the at least one skin prepreg and the bagging film, and a third reinforcement sheet made of carbon fiber reinforced plastics that is placed on the bagging film side between the at least one skin prepreg and the bagging film.

9. The method of manufacturing the honeycomb structural body of claim 8, wherein the at least one reinforcement sheet placed between the at least one skin prepreg and the multiple cores is bonded with a film adhesive to the multiple cores, the at least one skin prepreg, or both the multiple cores and the at least one skin prepreg.

10. A method of manufacturing a honeycomb structural body, comprising:

placing multiple cores that each have a honeycomb structure on both sides of foamed adhesive in a direction in which a number of multiple pores formed by the honeycomb structure is increased;

placing at least one skin prepreg on the multiple cores so as to cover the multiple pores;

protecting an outer surface side of the at least one skin prepreg by a bagging film;

placing at least one reinforcement sheet at, at least, either one of between the at least one skin prepreg and the bagging film, and between the at least one skin prepreg and the multiple cores, at a position where the at least one reinforcement sheet covers the foamed adhesive; and manufacturing the honeycomb structural body in which the multiple cores are bonded to each other with the foamed adhesive, and the at least one skin prepreg is cured and bonded to the multiple cores, by heating and pressurizing the multiple cores, the at least one skin prepreg, the bagging film, and the at least one reinforcement sheet in a set state, wherein the at least one reinforcement sheet comprises multiple reinforcement sheets including a reinforcement sheet made of cured prepreg that is placed between the at least one skin prepreg and the multiple cores, and a stack of reinforcement sheets that have mutually different widths and are placed between the at least one skin prepreg and the bagging film in order of the width, the stack of reinforcement sheets comprising a reinforcement sheet made of glass fiber reinforced plastics that is placed on the at least one skin prepreg side between the at least one skin prepreg and the bagging film, and a reinforcement sheet made of carbon fiber reinforced plastics that is placed on the bagging film side between the at least one skin prepreg and the bagging film.

11. The method of manufacturing the honeycomb structural body of claim 10, wherein the at least one reinforcement placed between the at least one skin prepreg and the multiple cores is bonded with a film adhesive to the multiple cores, the at least one skin prepreg, or both the multiple cores and the at least one skin prepreg.

* * * * *